United States Patent
Suzuki et al.

(10) Patent No.: US 6,486,262 B1
(45) Date of Patent: Nov. 26, 2002

(54) MOLDING MATERIAL FOR PLASTIC LENS

(75) Inventors: Teruhiko Suzuki, Kanagawa (JP); Tsutomu Nagamune, Kanagawa (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/445,378

(22) PCT Filed: Jun. 8, 1998

(86) PCT No.: PCT/JP98/02528

§ 371 (c)(1),
(2), (4) Date: Dec. 6, 1999

(87) PCT Pub. No.: WO98/55886

PCT Pub. Date: Dec. 10, 1998

(30) Foreign Application Priority Data

Jun. 6, 1997 (JP) .............................. 9-165159

(51) Int. Cl.[7] ...................... C08F 236/10; C08F 112/08; C08F 8/04; C08C 19/02; G02C 7/04
(52) U.S. Cl. .................. 525/332.9; 264/1.32; 351/159; 351/160 R; 351/166; 523/106; 525/333.3; 525/338; 525/339
(58) Field of Search .............................. 525/338, 333.3, 525/339, 332.9; 523/106; 264/1.32; 351/159, 160 R, 166

(56) References Cited

U.S. PATENT DOCUMENTS 4,743,652 A * 5/1988 Yoshida et al. .......... 525/332.9
5,352,744 A * 10/1994 Bates et al. ............... 525/333.3

FOREIGN PATENT DOCUMENTS

| EP | 0317263 | 5/1989 |
|----|---------|--------|
| GB | 0933596 | 8/1963 |
| JP | 62-201917 | 9/1987 |
| JP | 63-43910 | 2/1988 |
| JP | 64-1706 | 1/1989 |
| JP | 64-66216 | 3/1989 |
| JP | 1-132603 | 5/1989 |
| JP | 1-294721 | 11/1989 |
| JP | 1-317728 | 12/1989 |
| JP | 04075001 | * 7/1990 |
| JP | 4-75001 | 3/1992 |
| JP | 4-77520 | 3/1992 |
| JP | 4-106107 | 4/1992 |
| JP | 4-136008 | 5/1992 |
| JP | 4-335009 | 11/1992 |
| JP | 4-363312 | 12/1992 |
| JP | 7-258318 | 10/1995 |
| JP | 7-292020 | 11/1995 |

* cited by examiner

Primary Examiner—Peter Szekely
(74) Attorney, Agent, or Firm—Dinsmore & Shohl LLP

(57) ABSTRACT

A molding material for plastic lenses, comprising a hydrogenated product of an aromatic vinyl polymer, wherein the hydrogenated product of the aromatic vinyl polymer has properties that the hydrogenation rate of aromatic rings is at least 97%, the weight average molecular weight (Mw) is within a range of 50,000 to 500,000, and the ratio (Mw/Mn) of the weight average molecular weight (Mw) to the number average molecular weight (Mn) is at most 2.5, a plastic lens obtained by molding the molding material, novel hydrogenated products of aromatic vinyl polymers, which are suitable for use as molding materials, and a production process thereof.

4 Claims, No Drawings

MOLDING MATERIAL FOR PLASTIC LENS

TECHNICAL FIELD

The present invention relates to molding materials for plastic lenses, and more particularly to molding materials for plastic lenses, which have excellent strength properties, heat resistance, and molding and processing ability and are capable of forming plastic lenses sufficiently small in birefringence. The present invention also relates to plastic lenses molded from such a molding material. The present invention further relates to hydrogenated products of aromatic vinyl polymers, which are suitable for use in such optical materials, and a production process thereof.

BACKGROUND ART

Optical lenses molded from a plastic material have such features that they are excellent in impact resistance and formability, light-weight, capable of being colored and low in cost. As properties of polymers used in molding materials for plastic lenses, it is particularly important to be excellent in transparency, moldability, mechanical properties, low water absorption property, heat resistance, chemical resistance and the like and small in birefringence. Among plastic materials, polymethyl methacrylate (PMMA) has far excellent transparency and weather resistance and is a typical isotropic substance hardly causing birefringence. However, it has drawbacks that the water absorption property is relatively high, and its surface is easy to be damaged and it tends to cause solvent cracking by solvents. On the other hand, polystyrene is somewhat poor in transparency compared with PMMA, but has features that the light transmittance is high, the moldability and mechanical properties are good and the water absorption property is low. However, polystyrene has a drawback that it tends to cause birefringence.

The birefringence means a phenomenon that two refracted rays appear when light is incident on an anisotropic medium. More specifically, the birefringence is a phenomenon that light incident on an anisotropic material is divided into two light waves respectively having vibration directions perpendicular to each other. Accordingly, plastic materials used in application fields such as optical lenses in particular are required to be optically isotropic and hardly cause birefringence. The optical anisotropy is mainly controlled by a difference in the principal polarizability of a repeating unit. Benzene is great in the difference between polarizability in a plane direction and polarizability in a vertical direction. Accordingly, polymers having a benzene ring in their molecules, such as polystyrene, tend to cause birefringence.

Therefore, it has heretofore been attempted to reduce the birefringence of an aromatic vinyl polymer such as polystyrene by hydrogenating carbon-carbon double bonds in the aromatic rings (typically, benzene rings) of the aromatic vinyl polymer to saturate the double bonds, thereby producing a hydrogenated product of the aromatic vinyl polymer, which is excellent in transparency, moldability, mechanical properties, low water absorption property, and moreover low in birefringence and hence suitable for use in a molding material for plastic lenses.

For example, Japanese Patent Application Laid-Open No. 132603/1989 discloses a process for producing a hydrogenated product of polystyrene, in which azobisisobutyronitrile is used as a polymerization initiator to radical polymerize styrene, thereby synthesizing polystyrene, and the benzene rings in the polystyrene are then hydrogenated at a hydrogenation rate (degree of hydrogenation) of at least 30%. With respect to the hydrogenated products of polystyrene specifically disclosed in this publication, however, the hydrogenation rate of the benzene rings is as low as 60 to 80% in the case of a molecular weight as comparatively high as 100,000 to 120,000 in terms of a weight average molecular weight (Mw), and so the birefringence is not sufficiently reduced, whereas the hydrogenation rate of the benzene rings is high in the case of a molecular weight as comparatively low as 60,000 to 80,000 in terms of a weight average molecular weight (Mw), and so the birefringence is sufficiently reduced. However, such a low-molecular weight polymer is poor in strength properties. In addition, the hydrogenated products of polystyrene disclosed in the publication involve a problem that since the molecular weight distribution of polystyrene itself is comparatively wide, and the molecular weight distribution becomes wider due to the hydrogenation reaction, the strength properties and heat resistance of the hydrogenated products are lowered. Accordingly, the hydrogenated products described in the publication are not polymers having high strength properties and sufficiently small birefringence, and are hence poor in the balance between them.

Japanese Patent Application Laid-Open No. 75001/1992 discloses a process for producing a hydrogenated product of polystyrene, in which benzoyl peroxide is used as a polymerization initiator to radical polymerizing styrene, thereby synthesizing polystyrene having a weight average molecular weight (Mw) of 320,000, and the benzene rings in the polystyrene are then hydrogenated at a hydrogenation rate of 100%. In this hydrogenated product of polystyrene, the birefringence is sufficiently reduced since the hydrogenation rate is high. However, this hydrogenated product is wide in molecular weight distribution and contains a low-molecular weight component in a high proportion and hence involves a problem that when a plastic lens is molded therefrom, the lens cannot be provided as a plastic lens having sufficient strength properties and heat resistance.

Further, the plastic materials used in optical lenses tend to cause birefringence based on molecular orientation and mechanical strain upon molding. In general, the plastic materials are excellent in moldability and can be molded into optical lenses by injection molding, extrusion, press molding or the like. However, the plastic materials tend to cause molecular orientation and also to cause mechanical strain resulting from residual stress upon molding. Accordingly, the plastic materials are required to reduce birefringence based on molecular orientation and mechanical strain so as to permit the molding of optical lenses little in optical strain. Further, the plastic materials are required not to cause such problems that an optical lens cracks upon molding. As described above, the molding materials for plastic lenses are required to have excellent molding and processing ability that neither birefringence nor cracking is caused.

However, there has heretofore not been known any hydrogenated product of an aromatic vinyl polymer, which is far excellent in strength properties and heat resistance and low in birefringence, and has excellent molding and processing ability that neither birefringence nor cracking is caused upon molding.

DISCLOSURE OF THE INVENTION

It is an object of the present invention to provide a molding material for plastic lenses, which is far excellent in strength properties and heat resistance and low in birefringence, and has excellent molding and processing ability that neither birefringence nor cracking is caused upon molding.

Another object of the present invention is to provide a plastic lens molded from the molding material for plastic lenses having such excellent various properties.

A further object of the present invention is to provide a hydrogenated product of an aromatic vinyl polymer, which has such excellent various properties in combination and is suitable for use as optical materials including a molding material for plastic lenses, and a production process thereof.

The present inventors have carried out an extensive investigation with a view toward solving overcoming the above-described problems involved in the prior art. As a result, it has been found that hydrogenated products obtained by hydrogenating an aromatic vinyl polymer and having a hydrogenation rate (degree of hydrogenation) of aromatic rings as high as at least 97%, a weight average molecular weight within a comparatively high range and a narrow molecular weight distribution exhibits excellent various properties as molding materials for plastic lenses.

It has also been found that optical lenses having particularly high strength properties and extremely low birefringence in combination can be molded with good molding and processing ability from those having a hydrogenation rate of aromatic rings of at least 97%, a weight average molecular weight within a range of 100,000 to 300,000 and a molecular weight distribution of at most 2.0 among such hydrogenated products. Such specific hydrogenated products are novel substances not described in any literature. Such hydrogenated products can be obtained by synthesizing an aromatic vinyl polymer having a weight average molecular weight within a comparatively high range and an extremely narrow molecular weight distribution by preferably a solution polymerization process and then subjecting the polymer to a hydrogenation reaction at a high hydrogenation rate in the presence of a hydrogenation catalyst. In particular, the aromatic vinyl polymer having a weight average molecular weight within a comparatively high range and an extremely narrow molecular weight distribution permits easily raising the hydrogenation rate of aromatic rings thereof though it is high-molecular weight. In addition, the scission of its molecular chain upon the hydrogenation reaction is suppressed, whereby a hydrogenated product high in molecular weight, narrow in molecular weight distribution, low in the content of a low-molecular weight component and high in hydrogenation rate can be obtained. The hydrogenated product having such physical properties can provide plastic lenses balanced among various properties such as strength properties, heat resistance and low birefringence at a high level.

The present invention has been led to completion on the basis of these findings.

According to the present invention, there is thus provided a molding material for plastic lenses, comprising a hydrogenated product of an aromatic vinyl polymer, wherein the hydrogenated product of the aromatic vinyl polymer has the following properties:
(1) the hydrogenation rate of aromatic rings being at least 97%;
(2) the weight average molecular weight (Mw) being within a range of 50,000 to 500,000; and
(3) the ratio (Mw/Mn) of the weight average molecular weight (Mw) to the number average molecular weight (Mn) being at most 2.5.

According to the present invention, there is also provided a plastic lens obtained by molding the molding material for plastic lenses.

According to the present invention, there is further provided a hydrogenated product of an aromatic vinyl polymer, obtained by hydrogenating the aromatic vinyl polymer, wherein the hydrogenated product of the aromatic vinyl polymer has the following properties:
(a) the hydrogenation rate of aromatic rings being at least 97%;
(b) the weight average molecular weight (Mw) being within a range of 100,000 to 300,000; and
(c) the ratio (Mw/Mn) of the weight average molecular weight (Mw) to the number average molecular weight (Mn) being at most 2.0.

According to the present invention, there is still further provided a process for producing a hydrogenated product of an aromatic vinyl polymer by hydrogenating an aromatic vinyl polymer obtained by polymerizing an aromatic vinyl compound, the process comprising polymerizing the aromatic vinyl compound to synthesize an aromatic vinyl polymer having a weight average molecular weight (Mw) within a range of 100,000 to 400,000 and a ratio (Mw/Mn) of the weight average molecular weight (Mw) to a number average molecular weight (Mn) of at most 2.0 and then subjecting the aromatic vinyl polymer to a hydrogenation reaction in the presence of a hydrogenation catalyst to obtain a hydrogenated product having the following properties:
(a) the hydrogenation rate of aromatic rings being at least 97%;
(b) the weight average molecular weight (Mw) being within a range of 100,000 to 300,000; and
(c) the ratio (Mw/Mn) of the weight average molecular weight (Mw) to the number average molecular eight (Mn) being at most 2.0.

BEST MODE FOR CARRYING OUT THE INVENTION

Hydrogenated Product of Aromatic Vinyl Polymer

The hydrogenated product of an aromatic vinyl polymer useful in the practice of the present invention is obtained by hydrogenating an aromatic vinyl homopolymer or a (co) polymer of an aromatic vinyl compound and a monomer copolymerizable therewith.

(Aromatic Vinyl Compound)

No particular limitation is imposed on the aromatic vinyl compound so far as it is a compound having an aromatic ring and a polymerizable vinyl group. However, a styrene monomer represented by the formula (1):

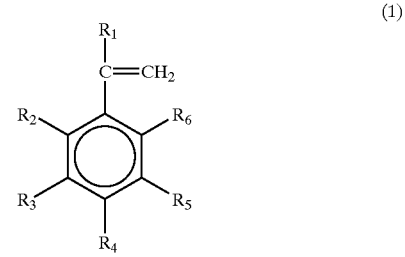

wherein $R_1$ means a hydrogen atom or an alkyl group, and $R_2$ to $R_6$ independently denote a hydrogen atom, an alkyl group or a halogen atom, is generally used.

The alkyl group of $R_1$ in the formula (1) is preferably a lower alkyl group having 1 to 5 carbon atoms. Specific examples thereof include methyl, ethyl, propyl, isopropyl, n-butyl, isobutyl, sec-butyl, tert-butyl and amyl groups.

$R_2$ to $R_6$ are preferably hydrogen atoms or alkyl groups, more preferably hydrogen atoms or the same lower alkyl groups having 1 to 5 carbon atoms as mentioned above. Examples of the halogen atom include fluorine, chlorine, bromine and iodine atoms.

Specific examples of the aromatic vinyl compound include styrene, α-methylstyrene, α-ethylstyrene, α-propylstyrene, α-isopropylstyrene, α-tert-butylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene, monochlorostyrene, dichlorostyrene and monofluorostyrene. Of these, styrene, α-methylstyrene, α-ethylstyrene, α-propylstyrene, α-isopropylstyrene, α-tert-butylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene and the like are preferred, with styrene, α-methylstyrene, α-ethylstyrene, α-propylstyrene, α-isopropylstyrene, α-tert-butylstyrene, 2-methylstyrene, 3-methylstyrene, 4-methylstyrene and 4-tert-butylstyrene being particularly preferred. In many cases, styrene is most preferably used.

These aromatic vinyl compounds may be used either singly or in any combination thereof.
(Copolymerizable Monomer)

No particular limitation is imposed on the monomer copolymerizable with the aromatic vinyl compound so far as it is copolymerizable with the aromatic vinyl compound in a polymerization process such as radical polymerization, anionic polymerization or cationic polymerization. Examples thereof include conjugated diene monomers such as 1,3-butadiene, isoprene, 2,3-dimethyl-1,3-butadiene, 1,3-pentadiene and 1,3-hexadiene; unsaturated nitrile monomers such as acrylonitrile, methacrylonitrile and α-chloroacrylonitrile; (meth)acrylic acid ester monomers such as methyl methacrylate and methyl acrylate; unsaturated fatty acid monomers such as acrylic acid, methacrylic acid and maleic anhydride; and phenylmaleimide. These monomers copolymerizable with the aromatic vinyl compound may be used either singly or in any combination thereof.

The content of the aromatic vinyl compound unit in the aromatic vinyl polymer is suitably selected as necessary for the end application intended. However, it is generally at least 50 wt. %, preferably at least 70 wt. %, more preferably at least 90 wt. %, most preferably 100 wt. %. The birefringence of the resulting hydrogenated product becomes smaller as the proportion of the aromatic vinyl compound in the aromatic vinyl polymer is higher. Thus, the content of the aromatic vinyl compound is preferably higher.

Since the present invention includes not only the case where the aromatic vinyl compound alone is used, but also the case where the copolymerizable monomer is used in combination as described above, the term "aromatic vinyl compound" as used herein means not only the case where the aromatic vinyl compound alone is used, but also the case where the copolymerizable monomer is used in combination unless expressly noted. Similarly, the term "aromatic vinyl polymer" means not only a homopolymer of the aromatic vinyl compound, but also a copolymer of the aromatic vinyl compound and the monomer copolymerizable therewith unless expressly noted.
(Hydrogenated Product)

It is necessary for the hydrogenation rate of aromatic rings in the hydrogenated product of the aromatic vinyl polymer to be at least 97% of the whole aromatic ring. The hydrogenation rate is preferably at least 98%, more preferably 99 to 100%. If the hydrogenation rate of the aromatic rings is low, the birefringence of the resulting hydrogenated product cannot be made sufficiently small. It is hence not preferable to hydrogenate the aromatic rings at such a low hydrogenation rate. The hydrogenation rate of the aromatic rings can be determined by a $^1$H-NMR measuring method in accordance with a method known per se in the art.

The weight average molecular weight (Mw) of the hydrogenated product of the aromatic vinyl polymer used in the molding material for plastic lenses according to the present invention is within a range of 50,000 to 500,000, preferably 90,000 to 300,000, more preferably 100,000 to 300,000, most preferably 100,000 to 250,000 in terms of polystyrene as measured by gel permeation chromatography (GPC). If the weight average molecular weight (Mw) is too low, the strength properties of the resulting molding material are lowered. If the weight average molecular weight (Mw) is too high, the molding and processing ability of the resulting molding material is lowered, and birefringence based on molecular orientation and mechanical strain upon molding tends to become great.

The molecular weight distribution of the hydrogenated product of the aromatic vinyl polymer used in the molding material for plastic lenses according to the present invention means a ratio (Mw/Mn) of the weight average molecular weight (Mw) to the number average molecular weight (Mn), both, in terms of polystyrene as measured by GPC and is at most 2.5, preferably at most 2.3, more preferably at most 2.0, most preferably at most 1.9. If the molecular weight distribution (Mw/Mn) of the hydrogenated product of the aromatic vinyl polymer is too great, the strength properties of the hydrogenated product is lowered to a great extent, and its glass transition temperature also shows a tendency to lower. Therefore, any optical lens sufficiently satisfying strength properties and heat resistance cannot be provided. The lower limit of the molecular weight distribution of the hydrogenated product is generally about 1.0, and often about 1.3.

The weight average molecular weight (Mw) and molecular weight distribution of the hydrogenated product are controlled within a range of 100,000 to 300,000 and to at most 1.8, respectively, whereby the hydrogenated product can be provided as a hydrogenated product combining particularly high strength properties with low birefringence.

Among these hydrogenated products of the aromatic vinyl polymers, those having the following properties:

(a) the hydrogenation rate of aromatic rings being at least 97%, preferably at least 98%, more preferably 99 to 100%;

(b) the weight average molecular weight (Mw) being within a range of 100,000 to 300,000, preferably a range of 100,000 to 250,000, more preferably a range of 140,000 to 230,000; and (c) the ratio (Mw/Mn) of the weight average molecular weight (Mw) to the number average molecular weight (Mn) being at most 2.0, preferably at most 1.9, more preferably at most 1.8 are novel substance not described in any literature, and particularly suitable for use as molding materials for plastic lenses because they are balanced among strength properties, heat resistance, molding and processing ability, and low birefringence at a high level.
(Production Process of Hydrogenated Product)

The hydrogenated product of the aromatic vinyl polymer used in the molding material for plastic lenses according to the present invention can be produced by radical polymerizing an aromatic vinyl compound using a radical initiator such as azobisisobutyronitrile and then hydrogenating the resultant aromatic vinyl polymer.

However, the hydrogenated product having the above-described properties (a) to (c) can be preferably produced by a process comprising using an organo-alkalimetallic compound as an initiator to solution-polymerizing the aromatic vinyl compound in an organic solvent, and then hydrogenating the resultant aromatic vinyl polymer having a high molecular weight and a narrow molecular weight distribution.

More specifically, in a process for producing a hydrogenated product of an aromatic vinyl polymer by hydrogenating an aromatic vinyl polymer obtained by polymerizing an aromatic vinyl compound, the aromatic vinyl compound is first polymerized to synthesize an aromatic vinyl polymer having (A) a weight average molecular weight (Mw) within a range of 100,000 to 400,000, preferably 100,000 to 300,000, more preferably 100,000 to 250,000 and (B) a ratio (Mw/Mn) of the weight average molecular weight (Mw) to the number average molecular weight (Mn) of at most 2.0, preferably at most 1.8, more preferably at most 1.5, and often a range of 1.0 to 1.2, and the aromatic vinyl polymer is then subjected to a hydrogenation reaction in the presence of a hydrogenation catalyst to produce a hydrogenated product having the above-described properties (a) to (c).

If the weight average molecular weight (Mw) of the aromatic vinyl polymer to be subjected to the hydrogenation reaction is extremely high, it is difficult to conduct the hydrogenation reaction of aromatic rings at a high hydrogenation rate, and a molecular chain scissoring reaction, which is a competitive reaction, proceeds if the hydrogenation reaction is allowed to proceed until the hydrogenation rate reaches about 100%, so that the molecular weight distribution (Mw/Mn) of the resulting hydrogenated product becomes wider, and the strength properties and heat resistance thereof are lowered because a low-molecular weight component increases. On the other hand, any weight average molecular weight too low results in a failure to provide an optical lens sufficiently satisfying strength properties and heat resistance.

The aromatic vinyl polymer having the properties (A) and (B) can preferably be obtained by solution-polymerizing the aromatic vinyl compound using an organo-alkalimetallic compound as an initiator in a hydrocarbon solvent in the presence of a Lewis base if desired. According to this solution polymerization process, an aromatic vinyl polymer having a high molecular weight and an extremely narrow molecular weight distribution can be synthesized with ease.

As examples of the organo-alkalimetallic compound, may be mentioned monoorganolithium compounds such as n-butyllithium, sec-butyllithium, tert-butyllithium, hexyllithium, phenyllithium and stilbenelithium; polyfunctional organolithium compounds such as dilithiomethane, 1,4- dilithiobutane, 1,4-dilithio-2-ethylcyclohexane and 1,3,5-trilithiobenzene; sodium naphthalene; and potassium naphthalene. Of these, the organolithium compounds are preferred, with the monoorganolithium compounds being particularly preferred.

These organo-alkalimetallic compounds may be used either singly or in any combination thereof. The amount of the organo-alkalimetallic compound used is suitably selected according to the molecular weight required of the polymer formed. It is generally within a range of 0.05 to 100 mmol, preferably 0.10 to 50 mmol, more preferably 0.15 to 20 mmol per 100 g of the monomer.

No particular limitation is imposed on the hydrocarbon solvent so far as it destroys the organo-alkalimetallic compound initiator. Examples thereof include aliphatic hydrocarbons such as n-butane, n-pentane, isopentane, n-hexane, n-heptane and isooctane; alicyclic hydrocarbons such as cyclopentane, cyclohexane, methylcyclopentane, methylcyclohexane and decalin; and aromatic hydrocarbons such as benzene and toluene. Of these, the use of an aliphatic hydrocarbon or alicyclic hydrocarbon is preferred because the hydrogenation reaction can be conducted as it is after the polymerization. These hydrocarbon solvents may be used either singly or in any combination thereof in an amount sufficient for the concentration of the monomer to amount to generally 1 to 30 wt. %.

The Lewis base is useful in that an aromatic vinyl polymer having a narrow molecular weight distribution is provided. No particular limitation is imposed on the Lewis base so far as it is generally used in the solution polymerization. Examples thereof include ether compounds; tertiary amine compounds such as tetramethylethylene-diamine, trimethylamine, triethylamine, pyridine and quinuclidine; alkali metal alkoxides such as potassium tert-amyloxide and potassium tert-butoxide; and phosphine compounds such as triphenylphosphine. Of these, the ether compounds are particularly preferred because the molecular weight distribution (Mw/Mn) of the resulting aromatic vinyl polymer can be sufficiently narrowed.

No particular limitation is imposed on the ether compounds. However, those having generally 2 to 100, preferably 4 to 50, more preferably 4 to 20 carbon atoms are preferably used. Specific examples thereof include aliphatic monoethers such as dimethyl ether, diethyl ether, diisopropyl ether, dibutyl ether, diamyl ether, diisoamyl ether, methyl ethyl ether, methyl propyl ether, methyl isopropyl ether, methyl butyl ether, methyl isoamyl ether, ethyl propyl ether, ethyl isopropyl ether and ethyl butyl ether; aromatic monoethers such as anisole, phenetole, diphenyl ether and dibenzyl ether; cyclic monoethers such as tetrahydrofuran and tetrahydropyran; alkylene glycol dialkyl ethers such as ethylene glycol dimethyl ether, ethylene glycol methyl ethyl ether, ethylene glycol diethyl ether, ethylene glycol dipropyl ether, ethylene glycol dibutyl ether, ethylene glycol diamyl ether, ethylene glycol dioctyl ether, propylene glycol dimethyl ether, propylene glycol diethyl ether, propylene glycol dibutyl ether, isopropylene glycol dimethyl ether, isopropylene glycol diethyl ether, butylene glycol dimethyl ether, butylene glycol diethyl ether and butylene glycol dibutyl ether alkylene glycol alkyl aryl ethers such as ethylene glycol methyl phenyl ether; alkylene glycol diaryl ethers such as ethylene glycol diphenyl ether; and alkylene glycol diaralkyl ethers such as ethylene glycol dibenzyl ether.

These Lewis base compounds may be used either singly or in any combination thereof. The amount of the Lewis base compound used is within a range of generally 0.001 to 10.0 mmol, preferably 0.01 to 5.0 mmol, more preferably 0.1 to 2.0 mmol per mole of the organo-alkaimetallic compound.

The polymerization reaction may be either an isothermal reaction or an adiabatic reaction, and is carried out in a polymerization temperature range of generally 0 to 150° C., preferably 20 to 120° C. The polymerization time is within a range of 0.01 to 20 hours, preferably 0.1 to 10 hours.

After the polymerization reaction, the polymer can be recovered by the publicly known method such as steam stripping, direct desolvating or alcoholic solidifying. In the present invention, the polymer may be fed to a hydrogenating step as it is without recovering the polymer from a polymer solution when a solvent inert to the hydrogenation reaction is used upon the polymerization.

No particular limitation is imposed on the hydrogenation process of the aromatic vinyl polymer, and the hydrogenation can be conducted in accordance with a method known per se in the art. However, a hydrogenation process, by which the hydrogenation rate of aromatic rings is high, and a polymer chain is scarcely scissored, is preferred. Specifically, for example, a hydrogenation catalyst containing at least one metal selected from among nickel, cobalt, iron, titanium, rhodium, palladium, platinum, ruthenium and rhenium can be used in an organic solvent to conduct a hydrogenation reaction. Among these hydrogenation catalysts, a nickel catalyst is preferred because a hydrogenated product having a particularly narrow molecular weight distribution (Mw/Mn) is provided. The hydrogenation catalyst may be either a heterogeneous catalyst or a homogeneous catalyst.

The heterogeneous catalyst may be used in the form of a metal or metal compound as it is, or by supporting it on a proper carrier. Examples of the carrier include active carbon, silica, alumina, calcium carbonate, titania, magnesia, zirconia, diatomaceous earth and silicon carbide. The amount of the hydrogenation catalyst supported on the carrier is within a range of generally 0.01 to 80 wt. %, preferably 0.05 to 60 wt. %.

As the homogeneous catalyst, there may be used a catalyst obtained by combining nickel, cobalt, titanium or iron compound with a organometallic compound (for example, organoaluminum or organolithium compound); or an organometallic complex of rhodium, palladium, platinum, ruthenium, rhenium or the like. Examples of the nickel, cobalt, titanium or iron compound used in the homogeneous catalyst include acetylacetone salts, naphthenates, cyclopentadienyl compounds and cyclopentadienyldichloro compounds of these various metals. As the organoaluminum, there may be suitably used an alkylaluminum such as triethylaluminum or triisobutylaluminum; an alkylaluminum halide such as diethylaluminum chloride or ethylaluminum dichloride; or an alkylaluminum hydride such as diisobutylaluminum hydride. As the organometallic complex, there may be used, for example, a γ-dichloro-π-benzene complex, dichloro-tris(triphenylphosphine) complex or hydrido-chloro-tris(triphenylphosphine) complex of any of the above-mentioned metals.

These hydrogenation catalyst may be used either singly or in any combination thereof. The amount of the hydrogenation catalyst used is within a range of generally 0.03 to 50 parts by weight, preferably 0.16 to 33 parts by weight, more preferably 0.33 to 15 parts by weight per 100 parts by weight of the aromatic vinyl polymer.

Examples of the organic solvent include the above-mentioned aliphatic hydrocarbons; the above-mentioned alicyclic hydrocarbons; ethers such as tetrahydrofuran and dioxane; alcohols; and esters. These organic solvents may be used either singly or in any combination thereof. The amount of the organic solvent used is within a range sufficient for the concentration of the aromatic vinyl polymer to amount to generally 1 to 50 wt. %. preferably 3 to 40 wt. %, more preferably 5 to 30 wt. %.

The hydrogenation reaction is performed at a temperature within a range of generally 10 to 250° C., preferably 50 to 200° C., more preferably 80 to 180° C. under a hydrogen pressure within a range of generally 1 to 300 kg/cm$^2$, preferably 10 to 250 kg/cm$^2$, more preferably 20 to 200 kg/cm$^2$. As hydrogen, molecular hydrogen is generally used.

Molding Material for Plastic Lens

The molding material for plastic lenses according to the present invention comprises the above-described hydrogenated product of the aromatic vinyl polymer as an essential component, and may contain other resins as needed.

No particular limitation is imposed on the other resin component, and examples thereof include general resins used in ordinary plastic lenses. Specific examples thereof include general-purpose transparent plastics such as polymethyl methacrylate, polycarbonate, poly(4-methyl-pentene-1), cyclohexyl methacrylate-methyl methacrylate copolymers and acrylonitrile-styrene copolymers (AS resins); alicyclic acrylic resins (optolets OZ-1000; product of Hitachi Chemical Co., Ltd.) and MS resins (product of Nippon Steel Chemical Co., Ltd.). Besides, novel transparent plastics described in "Development of the Newest Optical Resins: Properties and Design of High-Precision Parts: Molding Techniques" (Society of Technical Information), and the like may be mentioned.

As other resin components, may also be mentioned cycloolefin resins. Specific examples thereof include ① addition (co)polymers of alicyclic monomers having a norbornene ring described in Japanese Patent Application Laid-Open No. 292020/1995, ② ring-opening (co)polymers of alicyclic monomers having a norbornene ring described in Japanese Patent Application Laid-Open Nos. 363312/1992 and 77520/1992, ③ addition (co)polymers of cyclic conjugated diene monomers described in Japanese Patent Application Laid-Open No. 258318/1995 and ④ addition (co) polymers of monocyclic cycloolefin-monomers described in Japanese Patent Application Laid-Open No. 66216/1989. Of these, typical polymers of the cycloolefin resins of ① and typical polymers of the cycloolefin resins of ② are marketed under the trade name APEL (product of Mitsui Petrochemical Industries, Ltd.) and the trade names ZEONEX (product of Nippon Zeon Co., Ltd.) and ARTON (product of Japan Synthetic Rubber Co., Ltd.), respectively, and the marketed products are available.

These other resins may be used either singly or in any combination thereof. The content of the other resins in the resin component is suitably selected within limits not impeding the objects of the present invention. However, it is generally 50 wt. % or lower, preferably 30 wt. % or lower, more preferably 10 wt. % or lower.

The plastic lenses according to the present invention may be get to have a filtering function by uniformly dispersing and blending an absorbent which absorbs only rays in a specific wavelength region, and a colorant such as a dye or pigment. No particular limitation is imposed on the absorbent and colorant. However, examples thereof include near infrared absorbents which selectively absorb rays in an optional wavelength region in a near infrared wavelength region of 600 to 2,500 nm; and colorants such as dyes and pigments, which selectively absorb rays in a visible wavelength region of 600 or shorter. These absorbents and colorants are blended into the molding material for plastic lenses before use.

Specific examples of the near infrared absorbents include cyanine type near infrared absorbents, pyrylium type near infrared absorbents, squalyrium type near infrared absorbents, croconium type near infrared absorbents, azulenium type near infrared absorbents, phthalocyanine type near infrared absorbents, dithiol metal complex type near infrared absorbents, naphthoquinone type near infrared absorbents, anthraquinone type near infrared absorbents, indophenol type near infrared absorbents, and azi type near infrared absorbents. As examples of commercially available near infrared absorbents, may be mentioned SIR-103, SIR-114, SIR-128, SIR-130, SIR-132, SIR-152, SIR-159 and SIR-162 (all, products of Mitsui Toatsu Dye Co., Ltd.), and Kayasorb IR-750, Kayasorb IRG-002, Kayasorb IRG-003, IR-820B, Kayasorb IRG-022, Kayasorb IRG-023, Kayasorb CY-2, Kayasorb cCY-4 and Kayasorb CY-9 (all, products of Nippon Kayaku Co., Ltd.).

As the colorants, may be mentioned organic colorants and inorganic colorants. However, the organic colorants are preferred from the viewpoint of uniformly dispersing ability. As the organic colorants, there may be used organic pigments and dyes. The dyes are preferably insoluble in water.

No particular limitation is imposed on the organic colorants, and organic pigments and dyes generally compounded into transparent resins may be used. As preferable examples of the organic colorants, may be mentioned diarylide pigments such as Pigment Red 38; azo lake pigments such as Pigment Red 48:2, Pigment Red 53 and Pigment Red 57:1; condensed azo pigments such as Pigment Red 144, Pigment Red 166, Pigment Red 220, Pigment Red 221 and Pigment Red 248; benzimidazolone pigments such as Pigment Red 171, Pigment Red 175, Pigment Red 176, Pigment Red 185 and Pigment Red 208; quinacridone pigments such as Pigment Red 122; perylene pigments such as Pigment Red 149, Pigment Red 178 and Pigment Red 179; anthraquinone pigments such as Pigment Red 177; and anthraquinone color dyes.

These absorbents and colorants may be used either singly or in any combination thereof, and suitably selected as necessary for the end application intended.

Into the molding materials for plastic lenses according to the present invention, may be incorporated various compounding ingredients as needed. No particular limitation is imposed on the compounding ingredients so far as they are generally used in molding materials for plastic lenses. Examples thereof include antioxidants such as the phenol, phosphate and thiol types; ultraviolet absorbents such as the hindered phenol type; parting agents such as aliphatic alcohols, aliphatic esters, aromatic esters, triglycerides, fluorine-containing surfactants and higher fatty acid metal salts; lubricants; plasticizers; antistatic agents; and heavy metal deactivators. These compounding ingredients may be used either singly or in any combination thereof. The amount of the compounding ingredients used is suitably selected within limits not impeding the objects of the present invention.

Plastic Lens

The plastic lenses according to the present invention mean optical lenses obtained by using a plastic material comprising the hydrogenated product of the aromatic vinyl polymer as a principal component to conduct molding and processing.

No particular limitation is imposed on the optical lenses so far as they have a function of transmitting a light beam having a continuous wavelength distribution, such as sunbeam, or a light beam having a single wavelength, such as a laser beam to change the optical path of such a light beam. However, typical examples thereof include single lenses. The single lens means a transparent body surrounded by at least two spherical faces, aspherical faces or plane faces and can be classified into a lens having a function of focusing a light beam, a lens having a function of diverging a light beam and a lens having a function of refracting a light beam.

As a typical single lens composed mainly of plane faces and having a function of refracting a light beam, may be mentioned a prism. Other single lenses than the prism are composed mainly of a spherical face and a plane face, characterized in that they have a focal point, and can be classified into a lens having a function of focusing a light beam on the focal point and a lens having a function of diverging a light beam from the focal point. The single lenses having a focal point include spherical lenses and aspherical lenses. The spherical lenses can be classified into 6 basic forms of double-convex lens, double-concave lens, plano-convex lens, plano-concave lens, meniscus convex lens and meniscus concave lens from their shapes. The lenses having a convex face have a function of focusing a light beam, while the lenses having a concave face have a function of diverging a light beam. The meniscus lenses mean lenses the edge of which is curved in a crescent form. The aspherical lenses mean single lenses having an aspherical face, i.e., lenses each having an ellipsoidal, hyperbolic or parabolic face. The aspherical lenses are generally lenses having an axially symmetric face, or facially symmetric lenses. However, there are aspherical lenses having a complexly shaped face having no symmetry, which is referred to as a three-dimensional aspherical face or three-dimensional, freely curved face.

As other special lenses, may be mentioned lenses with fine concaves and/or convexes formed in a flat plate, such as a Fresnel lens and a lenticular lens.

The plastic lenses according to the present invention can be obtained by molding the molding material for plastic lenses in accordance with a method known per se in the art. As a molding process, there may be used, for example, injection molding, press molding, extrusion or the like.

In the case of, for example, injection molding, the molding is performed under conditions of a cylinder temperature of 220 to 350° C., preferably 250 to 300° C. The mold temperature is 50 to 180° C., preferably 80 to 150° C. The injection pressure is 300 to 2,000 kg/cm$^2$, preferably 600 to 1,500 kg/cm$^2$. The dwell time is 1 to 300 seconds, preferably 5 to 150 seconds. The cooling time is 20 to 300 seconds, preferably 30 to 150 seconds. With respect to the above-described molding conditions, decomposition, deterioration and the like occur if the cylinder temperature is too high, so that the strength properties of the resulting lens are deteriorated. If the temperature is too low, residual stress occurs in the resulting lens, which forms the cause of great birefringence. If the mold temperature is too high, stick in cavity occurs. If the mold temperature is too low, residual stress occurs in the resulting lens, which forms the cause of great birefringence. If the dwell time is too long, decomposition, deterioration and the like occur, so that the strength properties of the resulting lens are deteriorated. If the dwell time is too short, molding shrinkage becomes high. If the cooling time is too long, productivity is lowered. If the cooling time is too short, residual stress occurs in the resulting lens, which forms the cause of great birefringence. Therefore, it is preferred that these molding conditions fall within the above-described respective ranges, since the mechanical strength, birefringence, release property, productivity, etc. of the resulting lens are balanced with one another at a high level.

The plastic lenses according to the present invention can be improved in optical properties, chemical resistance, wear resistance, moisture permeability, etc. by providing a hard coating layer formed of an inorganic compound, silicone compound such as a silane coupling agent, acrylic monomer, vinyl monomer, melamine resin, epoxy resin, fluororesin, silicone resin, or the like on the surfaces thereof by a method such as heat curing, ultraviolet curing, vacuum deposition, sputtering or ion plating.

The plastic lenses according to the present invention are low in birefringence and excellent in mechanical strength properties and heat resistance and are hence used in a wide variety of application fields, such as whole beam transmission type lenses such as image pickup system lenses in a camera, image pickup system lenses in a video camera, microscope lenses, endoscope lenses, telescope lenses, binocular lenses, spectacle lenses and magnifying lenses; pickup lenses for optical disks such as CD, CD-ROM, WORM (write once optical disk), MO (rewritable optical disk; magneto-optical disk) and MD (minidisk); lenses in a laser scanning system, such as fθ lens and sensor lens for a laser beam printer; and prisms in a finder system of a camera. The lenses with the above-described absorbent, dye and/or pigment incorporated therein are used as infrared sensor lenses, auto-focus lenses, band-pass filter lenses, etc.

The hydrogenated products of the aromatic vinyl polymers according to the present invention are excellent in strength properties and heat resistance and low in birefringence and moreover also excellent in transferability and moldability such as precision-molding ability, and hence are also useful in other application fields of optical materials than optical lenses, such as optical disk substrates, light diffusing plates, optical cards, optical fibers, optical mirrors, substrates for liquid crystal display devices, light guiding plates, light guides, deflecting films and phase difference films.

EXAMPLES

The present invention will hereinafter be described more specifically by the following Preparation Examples, Examples and Comparative Examples. All designations of "part" or "parts" and "%" as will be used in these examples mean part or parts by weight and wt. % unless expressly noted.

Various physical properties were determined in accordance with the following methods:

(1) The weight average molecular weight (Mw) was determined in terms of a standard polystyrene value as measured by GPC using toluene as a solvent.

(2) The molecular weight distribution was determined by finding a weight average molecular weight (Mw) and a number average molecular weight (Mn) in terms of standard polystyrene values as measured by GPC using toluene as a solvent, and calculating out a ratio (Mw/Mn) between both values.

(3) The glass transition temperature (Tg) was measured by a differential scanning calorimeter (DSC).

(4) The hydrogenation rate of aromatic rings was determined by $^1$H-NMR measurement.

(5) The strength properties were determined by using a specimen molded at 200° C. by a hot press molding machine (manufactured by Tester Sangyo K.K.) to measure its tensile strength in accordance with JIS K 7113.

(6) The birefringence was measured by a polarizing microscope (manufactured by NIKON CORP.; 546 nm Sénarmont compensator).

Example 1

Preparation Example of Hydrogenated Product A

A stainless steel-made autoclave having an internal volume of 1 liter and equipped with an electromagnetic stirrer, which had been sufficiently dried and purged with nitrogen, was charged with 320 parts of dehydrated cyclohexane, 80 parts of styrene and 1.83 parts of dibutyl ether. While stirring the resultant mixture at 40° C. and a revolution speed of 400 rpm, 0.31 parts of a n-butyl-lithium solution (a hexane solution containing 15% of n-butyllithium) were added to initiate polymerization. After the polymerization was conducted for 3 hours under the same conditions, 0.42 parts of isopropyl alcohol were added to stop the reaction. The weight average molecular weight (Mw) and number average molecular weight (Mn) of the thus-obtained aromatic vinyl polymer (polystyrene) were measured to show them together with its molecular weight distribution in Table 1.

To 400 parts of the polymer solution containing the aromatic vinyl polymer were then added and mixed 12 parts of a stabilized nickel hydrogenation catalyst N163A (product of Nippon Chemical Industrial Co., Ltd.; silica-alumina carrier on which 40% nickel was supported), and the resultant mixture was charged into a stainless steel-made autoclave having an internal volume of 1.2 liters and equipped with an electric heater and an electromagnetic stirrer for controlling a hydrogenation reaction temperature. After completion of the charging, the interior of the autoclave was purged with nitrogen gas to conduct a hydrogenation reaction for 8 hours at a temperature of 230° C. and a hydrogen pressure of 45 kg/cm$^2$ while stirring the mixture at a revolution speed of 700 rpm. After completion of the hydrogenation reaction, the hydrogenation catalyst was removed by filtration from the reaction mixture, and 1,200 parts of cyclohexane were then added to the reaction mixture. Thereafter, the resultant mixture was poured into 10 liters of isopropanol to deposit Hydrogenated Product A of the aromatic vinyl polymer. Hydrogenated Product A was isolated by filtration and then dried by a vacuum dryer to recover Hydrogenated Product A of the aromatic vinyl polymer. The physical properties of the thus-obtained Hydrogenated Product A were measured and shown in Table 1.

Example 2

Preparation Example of Hydrogenated Product B

An experiment was conducted in the same manner as in Example 1 except that the amounts of dibutyl ether, 15% n-butyllithium solution, and isopropyl alcohol for stopping the polymerization were changed to 0.16 parts, 0.27 parts and 0.38 parts, respectively, to obtain an aromatic vinyl polymer and Hydrogenated Product B thereof. Their physical properties were shown in Table 1.

Example 3

Preparation Example of Hydrogenated Product C

An experiment was conducted in the same manner as in Example 1 except that the amounts of dibutyl ether, 15% n-butyllithium solution, and isopropyl alcohol for stopping the polymerization were changed to 0.11 parts, 0.19 parts and 0.25 parts, respectively, to obtain an aromatic vinyl polymer and Hydrogenated Product C thereof. Their physical properties were shown in Table 1.

Example 4

Preparation Example of Hydrogenated Product D

An experiment was conducted in the same manner as in Example 1 except that the amounts of dibutyl ether, 15% n-butyllithium solution, and isopropyl alcohol for stopping the polymerization were changed to 0.09 parts, 0.15 parts and 0.20 parts, respectively, to obtain an aromatic vinyl polymer and Hydrogenated Product D thereof. Their physical properties were shown in Table 1.

Example 5

Preparation Example of Hydrogenated Product E

A stainless steel-made autoclave having an internal volume of 1 liter and equipped with an electromagnetic stirrer, which had been sufficiently dried and purged with nitrogen, was charged with 100 parts of styrene and 0.05 parts of azobisisobutyronitrile to conduct polymerization for 24 hours while stirring the resultant mixture at 70° C. and a revolution speed of 400 rpm. After 1,200 parts of cyclohexane were added to the polymerization reaction system, the resultant mixture was poured into 10 liters of isopropanol to deposit a polymer. The polymer was isolated by filtration and then dried by a vacuum dryer to obtain 90 parts of an aromatic vinyl polymer (polystyrene). Dissolved in 320 parts of dehydrated cyclohexane were 80 parts of the polymer to conduct a hydrogenation reaction for 12 hours in the same manner as in Example 1, thereby obtaining Hydrogenated Product E. The physical properties of the aromatic vinyl polymer and Hydrogenated Product E thereof were shown in Table 1.

Comparative Example 1

Preparation Example of Hydrogenated Product F

An experiment was conducted in the same manner as in Example 5 except that the amount of azobisisobutyronitrile and the polymerization temperature were changed to 0.04 parts and 90° C., respectively, to obtain Hydrogenated Product F. The physical properties of the aromatic vinyl polymer and Hydrogenated Product F thereof were shown in Table 1. From the results shown in Table 1, it is understood that the weight average molecular weight (Mw) of Hydrogenated Product F was markedly lowered due to the hydrogenation reaction, and the molecular weight distribution (Mw/Mn) thereof was widened.

Comparative Example 2

Hydrogenated Product F of the aromatic vinyl polymer prepared in Comparative Example 1 was molded under the same conditions as in Example 6. As a result, cracking occurred at the edge surface of a lens, and so no sufficient molding was feasible. Therefore, birefringence was also unmeasurable. The results were shown in Table 2.

TABLE 2

| | Code of hydrogenated polymer | Tensile strength (kg/cm$^2$) | Birefringence (nm) | Molding and processing ability |
| --- | --- | --- | --- | --- |
| Ex. 6 | A | 220 | 13 | Good |
| Ex. 7 | B | 230 | 13 | Good |
| Ex. 8 | C | 350 | 12 | Good |
| Ex. 9 | D | 365 | 10 | Good |
| Ex. 10 | E | 345 | 21 | Good |
| Comp. Ex. 2 | F | 150 | — | Cracking occurred at edge surface of lens |

As apparent from the results shown in Tables 1 and 2, the use of the molding materials for plastic lenses according to the present invention permits the provision of optical lenses high in tensile strength and low in birefringence (Examples 1 to 5, Examples 6 to 10). In view of the fact that the good optical lenses low in birefringence and free of cracking were provided, it is understood that these molding materials are excellent in molding and processing ability. These molding materials are high in glass transition temperature (Tg) and hence excellent in heat resistance. In particular, when the

TABLE 1

| | Before hydrogenation | | | After hydrogenation | | | Hydrogenation rate (%) | Tg (° C.) | Code of hydrogenated polymer |
| --- | --- | --- | --- | --- | --- | --- | --- | --- | --- |
| | Mn | Mw | Mw/Mn | Mn | Mw | Mw/Mn | | | |
| Ex. 1 | 113,636 | 125,000 | 1.10 | 48,421 | 92,000 | 1.90 | 100 | 140 | A |
| Ex. 2 | 126.786 | 142,000 | 1.12 | 55,263 | 105,000 | 1.90 | 100 | 140 | B |
| Ex. 3 | 192,308 | 200,000 | 1.04 | 85,714 | 150,000 | 1.75 | 100 | 140 | C |
| Ex. 4 | 240,385 | 250,000 | 1.04 | 102,857 | 180,000 | 1.75 | 99 | 140 | D |
| Ex. 5 | 137,500 | 220,000 | 1.60 | 69,565 | 160,000 | 2.30 | 99 | 140 | E |
| Comp. Ex. 1 | 95,652 | 220,000 | 2.30 | 25,556 | 92,000 | 3.60 | 100 | 139 | F |

Examples 6 to 10

Molding Examples of Plastic Lens

Hydrogenated Products A to E of the aromatic vinyl polymers prepared in Examples 1 to 5 were molded at a clamping force of 30 t, a resin temperature of 300° C., a mold temperature of 125° C. and an injection pressure of 900 kg/cm$^2$ by means of an injection molding machine (AUTOSHOTC MODEL 30A; manufactured by FANAC K.K.) to form aspherical pickup lenses for CD player each having an effective diameter of 4.5 mm, a thickness of 3.4 mm and a focal length of 4.5 mm. The light transmittances at 780 nm of the lenses thus obtained were all at least 91%.

The birefringences of the pickup lenses were determined. The results thereof were shown in Table 2.

In addition, specimens obtained by molding Hydrogenated Products A to E at 200° C. by a hot press molding machine (manufactured by Tester Sangyo K.K.) were used to measure the tensile strength of each hydrogenated product. The results thereof were shown in Table 2.

hydrogenated products (Examples 2 to 4) having a hydrogenation rate of at least 97%, a weight average molecular weight (Mw) within a range of 100,000 to 300,000 and a molecular weight distribution (Mw/Mn) of at most 2.0 are used, optical lenses combining high tensile strength with markedly low birefringence can be provided (Examples 7 to 9).

INDUSTRIAL APPLICABILITY

According to the present invention, there are provided molding materials for plastic lenses, which are far excellent in strength properties and heat resistance and low in birefringence, and have excellent molding and processing ability that neither birefringence nor cracking is caused upon molding, and plastic lenses obtained by molding such molding materials. According to the present invention, there are provided hydrogenated products of aromatic vinyl polymers, which are suitable for use as molding materials for plastic lenses, and a production process thereof. The plastic lenses according to the present invention are useful in a field of precision optical lenses of which high strength properties and heat resistance and low birefringence are required, in particular, as pickup lenses for optical disks, camera lenses and printer lenses. The hydrogenated products of the aromatic vinyl polymers according to the present invention are useful as molding materials particularly excellent in the above-described properties in the above field, and also in other precision optical fields than lenses.

What is claimed is:

1. A process for producing a hydrogenated product of an aromatic vinyl polymer by hydrogenating an aromatic vinyl polymer obtained by polymerizing an aromatic vinyl compound, the process comprising polymerizing the aromatic vinyl compound to synthesize an aromatic vinyl polymer having a weight average molecular weight (Mw) within a range of 100,000 to 400,000 and a ratio (Mw/Mn) of the weight average molecular weight (Mw) to a number average molecular weight (Mn) of at most 2.0, and then subjecting the aromatic vinyl polymer to a hydrogenation reaction in the presence of a hydrogenation catalyst supported on a silica-alumina carrier to obtain a hydrogenated product having the following properties:

(a) the hydrogenation rate of aromatic rings being at least 97%;

(b) the weight average molecular weight (Mw) being within a range of 100,000 to 300,000; and (c) the ratio (Mw/Mn) of the weight average molecular weight (Mw) to the number average molecular weight (Mn) being at most 2.0.

2. The production process according to claim 1, wherein the aromatic vinyl polymer is synthesized by solution-polymerizing the aromatic vinyl compound using an organoalkalimetallic compound as an initiator in a hydrocarbon solvent.

3. The production process according to claim 2, wherein the aromatic vinyl compound is solution-polymerized in the presence of a Lewis base.

4. The production process according to claim 1, wherein the hydrogenation catalyst comprises a nickel, cobalt, titanium or iron compound.

* * * * *